(No Model.)

I. BROOKE.
SHUTTER FASTENER.

No. 308,128. Patented Nov. 18, 1884.

WITNESSES:
A. P. Grant,
W. F. Kircher

INVENTOR:
Isaac Brooke,
BY John A. Wiedersheim
ATTORNEY.

UNITED STATES PATENT OFFICE.

ISAAC BROOKE, OF POTTSTOWN, PENNSYLVANIA.

SHUTTER-FASTENER.

SPECIFICATION forming part of Letters Patent No. 308,128, dated November 18, 1884.

Application filed May 15, 1884. (No model.)

*To all whom it may concern:*

Be it known that I, ISAAC BROOKE, a citizen of the United States, residing in Pottstown, in the county of Montgomery, State of Pennsylvania, have invented a new and useful Improvement in Shutter-Bolts, which improvement is fully set forth in the following specification and accompanying drawings, in which—

Figure 1:
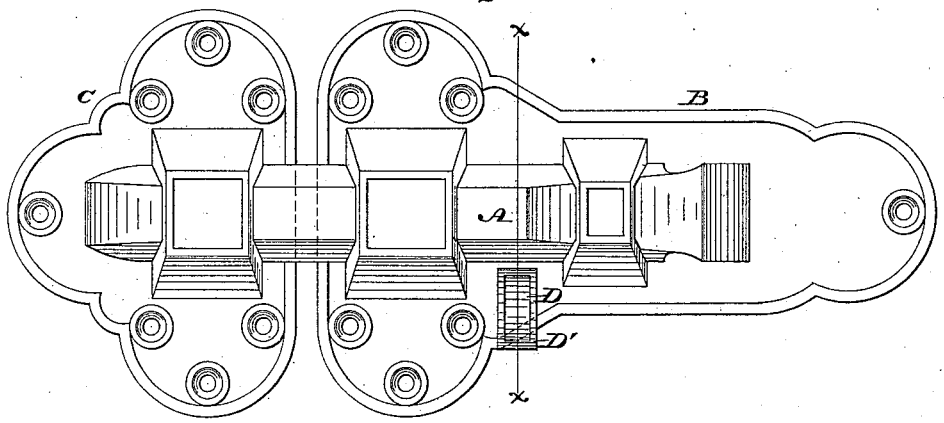
Figure 2:
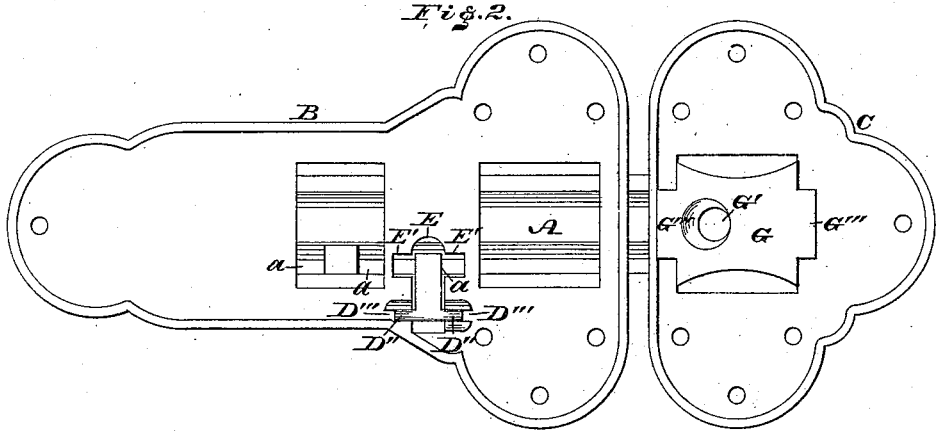
Figure 3:
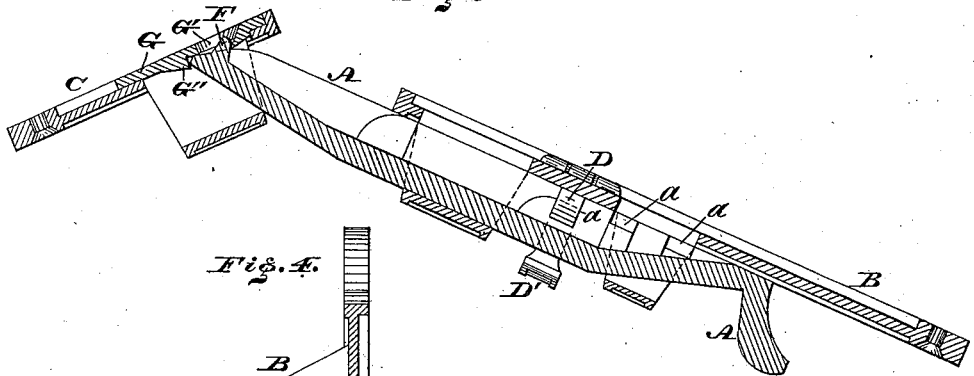
Figure 4:
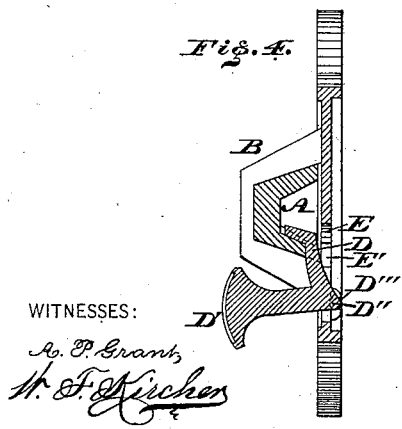

Figure 1 is a front view of a shutter-bolt embodying my invention. Fig. 2 is a rear view thereof. Fig. 3 is a central horizontal section of the device as a shutter-bower. Fig. 4 is a section in line $x$ $x$, Fig. 1.

Similar letters of reference indicate corresponding parts in the several figures.

My invention consists of a shutter-bolt provided with a gravitating dog or lock adapted to engage with notches or shoulders on the back of the bolt, said notches or shoulders thus being concealed from the front and the dog retaining its position, as will be hereinafter set forth, the bolt being also adapted for bowing the shutters.

Referring to the drawings, A represents a sliding bolt; B, the plate thereof, and C the keeper. On the rear or inner face of the bolt are notches $a$ $a$, with either of which engages a dog or lock, D, the handle D' whereof is at the front of the plate B, so that by raising said handle the nose of the dog moves rearward or inward clear of the bolt, whereby the latter may be moved or operated. When the dog is let go, it falls outwardly by gravity, and thus engages with the bolt, the nose dropping into the respective notch of the bolt and locking said bolt, it being noticed that the notches being on the rear or inner face of the bolt are not visible from the front of the bolt. The dog is somewhat of L-shape and formed with gudgeons D'', which enter depressions D''' on the rear of the plate B, said depressions being in the walls of a slot, E, which is formed in said plate, the same being recessed laterally, as at E', the recesses extending parallel with the depressions D'''. By this provision the dog may be inserted in position from the front or rear of the plate through the slot E and lateral recesses E', the gudgeons D'' entering the depressions D''' as the bearings thereof, the bolt being previously removed. When the dog is located, the bolt may be passed through the guides or eyes of the plate B, the nose of the dog being behind the bolt and the plate screwed or otherwise fastened to the shutter, whereby the dog retains its position and is operative for locking and unlocking the bolt, as has been previously stated. On the inner face of the front end of the bolt is a spur or stud, F, and on the rear of the keeper C is a plate, G, having an opening, G', and a shoulder, G''. When the shutters are to be locked, the bolt A may be shot in and out of the keeper without interference of the plate. When the shutters are to be bowed, they are placed at the desired angle and the bolt moved so as to insert the spur F into the opening G', the front end of the bolt abutting against the shoulder G''. The dog D engages with one of the notches $a$ and locks the bolt, securely holding the shutters in their bowed position. The plate G is formed with wings G''', which rest on the walls of the opening in the keeper which said plate occupies, the sides of the main portion of the plate engaging with said walls, so that when the keeper is screwed to the shutter it holds the back of the plate against the same, thus retaining the plate in position. The shoulder G'' prevents the bolt from being disengaged from the plate G from the outside, as the front end of the bolt and the face of the shoulder are somewhat angular and interlock, and the bolt is controlled by the dog D.

Having thus described my invention, what I claim as new, and desire to secure by Letters Patent, is—

1. A bolt having notches on its rear face, in combination with a plate having a slot and depressions on the rear thereof, and a dog formed with a nose and gudgeons, the latter having their bearings on said depressions and the former being located behind the bolt, substantially as and for the purpose set forth.

2. The bolt with notches, in combination with the plate having a slot, E, recesses E', and depressions D''', and the dog D with gudgeons D'', combined and operating substantially as and for the purpose set forth.

3. The bolt, plate, and dog, in combination with the keeper, having a plate formed with an opening, said bolt having a stud which enters said opening and notches, either of which is engaged by said dog, substantially as and for the purpose set forth.

4. A combined shutter bolt and bower, consisting of the plate B, having a slot, E, recesses E', and depressions D''', the bolt A with notches $a$, and spur F, the dog D with gudgeons D'', and the keeper C with the plate G, having an opening, G', substantially as and for the purpose set forth.

ISAAC BROOKE.

Witnesses:
 JOHN A. WIEDERSHEIM,
 JNO. K. PLITT.